United States Patent
Starkey et al.

(10) Patent No.: US 6,866,406 B1
(45) Date of Patent: Mar. 15, 2005

(54) SIDE ILLUMINATION ARRANGEMENT FOR MOTOR VEHICLE

(75) Inventors: Alan R. Starkey, Exton (GB); Andrew J. Assinder, Bognor Regis (GB); Richard G. Teal, Waterlooville (GB)

(73) Assignee: Schefenacker Vision Systems UK Limited, Portchester (GB)

( * ) Notice: Subject to any disclaimer, the term of this patent is extended or adjusted under 35 U.S.C. 154(b) by 0 days.

(21) Appl. No.: 10/069,832

(22) PCT Filed: Aug. 25, 2000

(86) PCT No.: PCT/GB00/03313

§ 371 (c)(1),
(2), (4) Date: Aug. 21, 2002

(87) PCT Pub. No.: WO01/15934

PCT Pub. Date: Mar. 8, 2001

(30) Foreign Application Priority Data

Aug. 27, 1999 (GB) .............................. 9920225

(51) Int. Cl.⁷ ................................................. B60Q 1/00
(52) U.S. Cl. ........................ 362/501; 362/540; 362/506; 362/509
(58) Field of Search ................................ 362/540, 541, 362/500, 501, 509, 506, 495, 496

(56) References Cited

U.S. PATENT DOCUMENTS

| 2,086,524 A | * | 7/1937 | Clark | 362/493 |
| 2,325,403 A | | 7/1943 | Illiano | 362/506 |
| 3,947,677 A | | 3/1976 | Steinle | 362/506 |
| 5,017,903 A | * | 5/1991 | Kripplez, Sr. | 340/472 |
| 5,255,164 A | | 10/1993 | Eidelman | 362/540 |
| 6,018,295 A | * | 1/2000 | Jewell | 362/540 |

FOREIGN PATENT DOCUMENTS

| DE | 4305653 | 3/1994 |
| FR | 2370606 | 6/1978 |
| FR | 2760419 | 9/1998 |
| WO | WO 82/00272 | 2/1982 |

* cited by examiner

*Primary Examiner*—Alan Cariaso
*Assistant Examiner*—Ali Alavi
(74) *Attorney, Agent, or Firm*—Warn, Hoffmann, Miller & LaLone, P.C.

(57) ABSTRACT

A downwardly directed light (38) is mounted within a horizontally extending rubbing strip (24) on a vehicle door (18) below the level of a window in the door and a light is mounted within said rubbing strip. This arrangement illuminates a lower part of the side of the vehicle and the adjacent ground. Its installation does not require any extensive modification to the body panels of the vehicle.

5 Claims, 2 Drawing Sheets

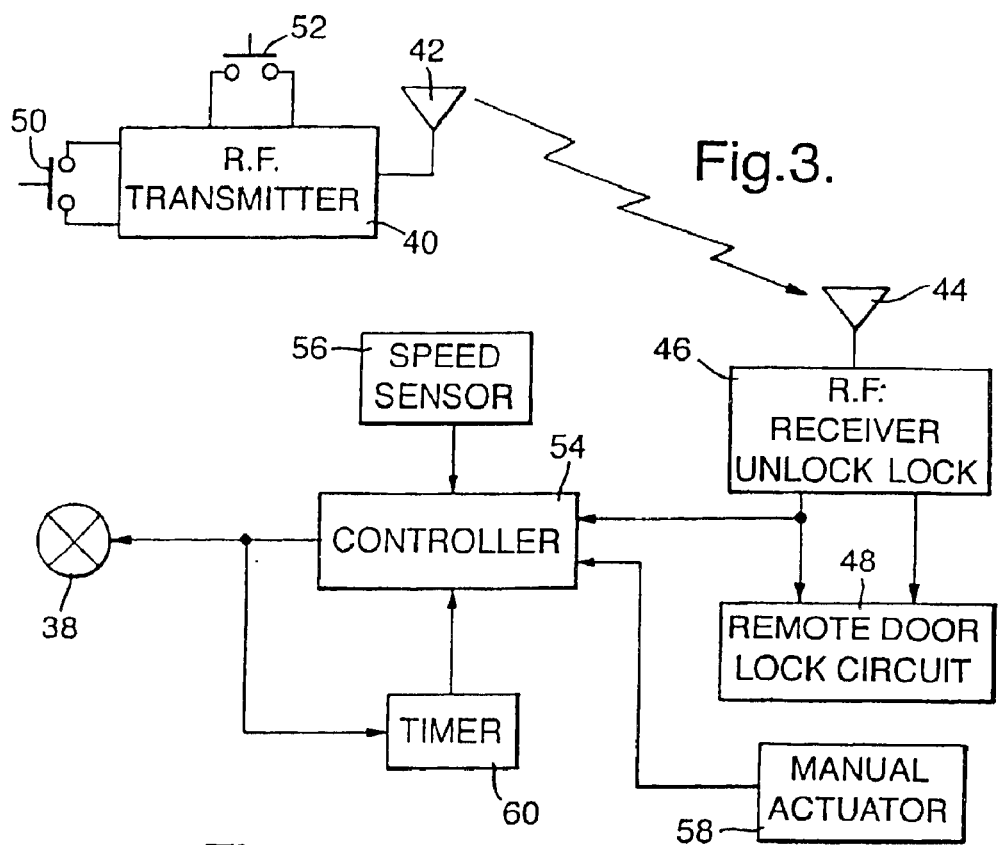
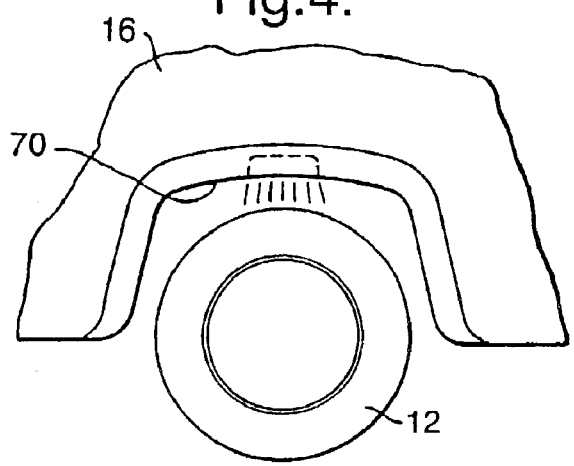
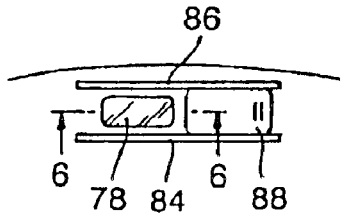
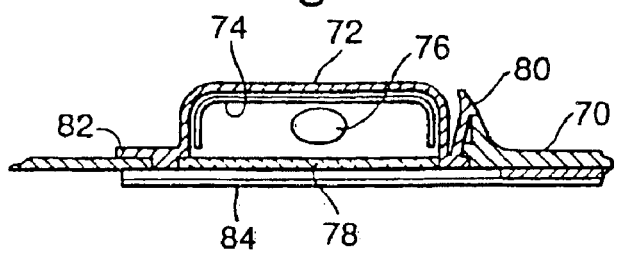
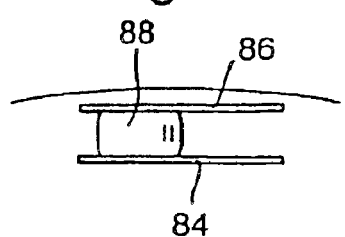

SIDE ILLUMINATION ARRANGEMENT FOR MOTOR VEHICLE

This invention relates to a side illumination arrangement for a motor vehicle arranged to illuminate the ground.

Illumination arrangements of this type can serve many purposes. For example, GB-A-894928 discloses an arrangement of this type for the purpose of providing a pool of light on each side of the vehicle in order to enhance its visibility to other drivers. The arrangement comprises six downwardly directed lights on each side of the vehicle mounted in specially provided housings formed in the panels of the vehicle body and located below the level of the bottom of the vehicle windows. This arrangement is relatively expensive to provide because of the necessity to modify vehicle body panels in order to incorporate the light housings.

DE-A-3635471 discloses an arrangement of this type comprising a light mounted in a vehicle door mirror. The vehicle has a door locking system which is operable by means of a hand held remote transmitter and operation of the lights is linked to the door locking system so that the lights are illuminated when the doors are unlocked, thereby illuminating the ground in the vicinity of the vehicle door. This arrangement serves both to illuminate any puddles adjacent to the vehicle door and also to illuminate any malefactor who may be lurking in the vicinity of the vehicle.

The height at which lights of this type are mounted is a compromise. On the one hand, the area of illumination from a single light can be increased by increasing the height at which the light is mounted. On the other hand, if the lights are mounted below the level of the bottom of the vehicle windows, any tendency to dazzle other road users is reduced.

Accordingly, at is an object of the invention to provide a lighting arrangement of the type described above in which the lights are mounted below the level of the bottom of the vehicle windows without requiring any extensive modification to the body panels of the vehicle.

According to the invention in one aspect, in a motor vehicle having a horizontally extending rubbing strip mounted on each vehicle door below the level of the vehicle windows, a downwardly directed light is mounted within such rubbing strip.

Preferably, a plurality of such lights are provided spaced apart from one another along a respective rubbing strip on each side of the vehicle.

According to the invention in another aspect, a downwardly directed light is mounted inside each wheel arch of a motor vehicle. Such a light provides illumination to assist when it is necessary to change a wheel during the hours of darkness.

Embodiments of the invention will now be described, by way of example, with reference to the accompanying drawings, in which:

FIG. 3 is a block diagram of a control system for the lights shown in FIGS. 1 to 6;

FIG. 4 is a side view of one of the wheel arches of a motor vehicle equipped with a downwardly directed light in accordance with the invention;

FIG. 5 is a plan view from below of the light shown in FIG. 4 with a cover in an open position;

FIG. 6 is a cross-sectional view taken on the line 6—6 in FIG. 5; and

FIG. 7 is a plan view from below similar to FIG. 4 but showing the shutter in its closed position.

Figure 1:
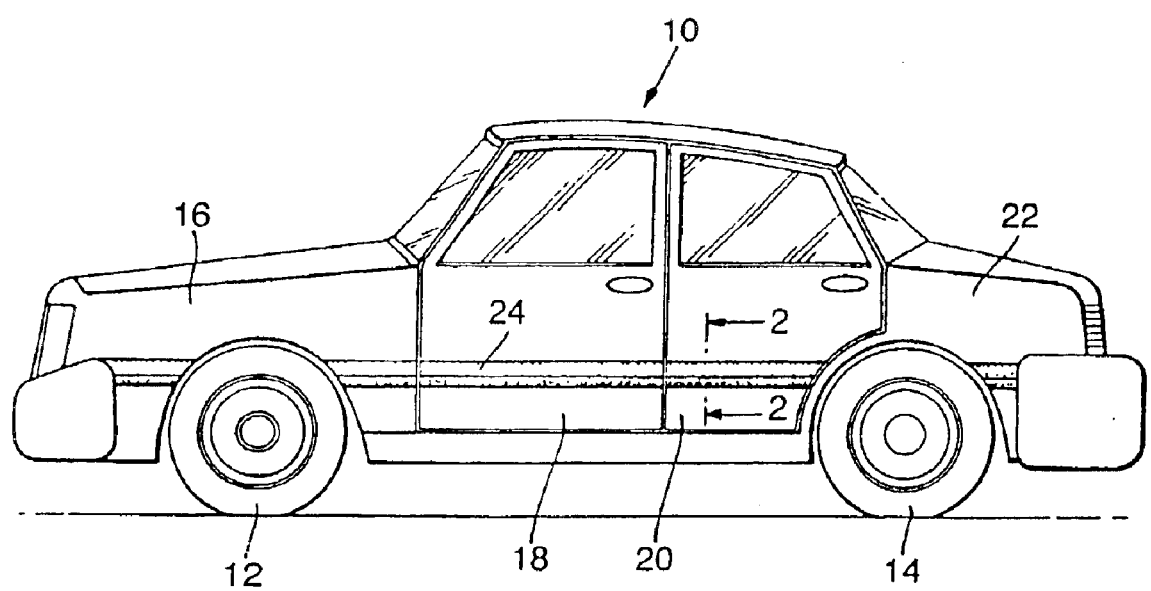
FIG. 1 is a side view of a motor vehicle equipped with a webbing strip having downwardly directed lights in accordance with the invention.

FIG. 1 shows a motor vehicle 10 having front and rear wheels 12 and 14, a front quarter panel 16, a front door 18, a rear door 20 and a rear quarter panel 22 along each of which extends a respective section of a rubbing strip 24, which is made of extruded synthetic rubber or similar resilient or semi-resilient material. The other side of the vehicle is a substantial mirror image of the side illustrated in FIG. 1.

Figure 2:
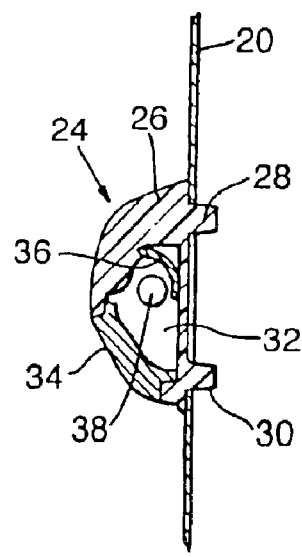
FIG. 2 is a cross-sectional view on the line 22 in FIG. 1.

Referring to FIG. 2, the rubbing strip 24 comprises a moulded body 26 of substantially uniform cross-section along its length and with substantially conical projections 28 and 30 at intervals therealong adapted to project through holes in the vehicle body panels. The projections 28 and 30 are equipped with conventional lateral projections (not shown) arranged to engage with the inner surface of the corresponding body panel such as the body panel 20 so as to hold the strip 24 in place.

In accordance with the invention, the body 26 of the rubbing strip 24 contains an elongate recess 32 which has an opening on its lower side enclosed by a translucent lens 34. A reflector 36 extends along the upper and inner end of the recess 32 which also contains a light source 38 which may comprise a row of tungsten filament bulbs, a row of light-emitting diodes or any other convenient lights source as desired. Seal members (not shown) close the ends of the recess 32 each section of the rubbing strip 18.

Instead of forming the rubbing strip 24 from extruded material, each section thereof may be formed as an individual moulding, thus avoiding the need for seal members to close the ends of the recess 32 in each section. Electrical conductors for energising the light source 38 may be embedded in such a moulding. As an alternative to providing the recess 32, light emitting diodes may be moulded into each section of the rubbing strip, thus avoiding the need to provide a separate lens 34 and reflector 36.

FIG. 3 shows a control system for the light source 38, which inhibits energisation when the vehicle 10 is travelling at normal highway speed. The control system includes a pocket-size radio frequency transmitter 40 intended to be carried by the vehicle operator. The transmitter 40 has an antenna 42 for sending a radio frequency signal to a corresponding antenna 44 of a receiver 46 mounted on the vehicle 10. As is conventional, the receiver 46 provides output signals to a remote door lock circuit 48 for locking and unlocking the vehicle doors 18, 20. The transmitter 40 has a first push button 50 for sending a signal to cause the remote door lock circuit to lock the vehicle doors and a second push button 52 for sending a signal to cause the remote door lock circuit 48 to unlock the vehicle doors 18, 20.

The "unlock" output from the receiver 56 is also connected to a controller 54 which also receives an output from a speed sensor 56 and a manual actuator 58. The speed sensor 56 supplies a signal to the controller 54 indicating whether the vehicle speed is less or greater than a threshold value, for example 5 mph. The controller 54 supplies an output signal which both starts a timer 50 and causes energisation of the light source 38. The speed sensor 56 prevents energisation of the light source 38 when the vehicle speed is greater than the aforesaid threshold value. The operation of this system is described in more detail in co-pending UK Patent Application No. 9819517.5 and will not be described here in more detail.

Instead of the speed sensor 56, the controller 54 may be arranged to respond to placing the vehicle in gear, engaging forward gear or starting the engine. Alternatively or additionally, a manual switch inside the vehicle may be arranged to energise the light source 38 and/or to inhibit it from being turned on by the remote transmitter 40.

Referring to FIGS. 4, 5 and 6, the front wheel 12 of the motor vehicle 10 is located under a wheel arch 70 in which is mounted a light housing 72 containing a reflector 74 and a light source 76 which may be a tungsten filament lamp or a light-emitting diode. The bottom of the housing 74 has an opening which is covered by a translucent lens 78. The housing 72 has a resiliently mounted lug 80 at one end and a fixed lug 82 at the other. The lugs 80 and 82 engage with opposite edges of the opening in the wheel arch 70 so as to hold the housing 74 in place.

As can best be seen from FIGS. 5 and 7, the housing 72 also has two guide tracks 84 and 86 extending on opposite sides of the lens 78. A cover 88 is slidably mounted in the guide tracks 84 and 86 so as to be movable between a position shown in FIG. 5 in which the lens 78 is exposed and a position shown in FIG. 7 in which the lens 78 is covered. Normally, the cover 88 is in its closed position so as to protect the lens 78 from debris thrown up by the wheel 12. When it is desired to illuminate the adjacent area, for example to assist in changing the wheel 12, the cover 88 can be slid to its open position. Energisation of the bulb 76 is controlled by a manual switch in the vehicle. The wheel arches of the other three wheels of the motor vehicle 10 are preferably equipped with similar lights.

What is claimed is:

1. A side illumination arrangement for a motor vehicle:

a horizontally extending rubbing strip mounted on a vehicle door below the bottom of the vehicle windows of said door, wherein downwardly directed lights are mounted within said rubbing strip without requiring any extensive modifications to the body panels of said vehicle, wherein said downwardly directed lights are arranged to illuminate the lower part of the side of said vehicle and the adjacent ground.

2. A side illumination arrangement according to claim 1, having a plurality of lights spaced apart from one another along said rubbing strip.

3. A side illumination arrangement according to claim 1, having a respective rubbing strip on each side of the vehicle and a downwardly directed light mounted within each rubbing strip.

4. A side illumination according to claim 1 further comprising a downwardly directed light mounted inside a wheel arch of a motor vehicle.

5. A side illumination arrangement according to claim 4, wherein a respective downwardly directed light is mounted inside each wheel arch of said motor vehicle.

* * * * *

UNITED STATES PATENT AND TRADEMARK OFFICE
CERTIFICATE OF CORRECTION

PATENT NO. : 6,866,406 B1
DATED : March 15, 2005
INVENTOR(S) : Alan R. Starkey et al.

It is certified that error appears in the above-identified patent and that said Letters Patent is hereby corrected as shown below:

Column 1,
Line 34, "Accordingly, at is" should be -- Accordingly, it is --.
Line 58, "line 22 in" should be -- line 2-2 in --.

Signed and Sealed this

Sixth Day of September, 2005

JON W. DUDAS
*Director of the United States Patent and Trademark Office*